(12) United States Patent
Saitoh (10) Patent No.: US 7,492,491 B2
(45) Date of Patent: Feb. 17, 2009

(54) IMAGE PROCESSING APPARATUS

(75) Inventor: Makoto Saitoh, Osaka (JP)

(73) Assignee: Sanyo Electric Co., Ltd., Osaka (JP)

( * ) Notice: Subject to any disclaimer, the term of this patent is extended or adjusted under 35 U.S.C. 154(b) by 1026 days.

(21) Appl. No.: 10/797,648

(22) Filed: Mar. 10, 2004

(65) Prior Publication Data

US 2004/0179241 A1    Sep. 16, 2004

(30) Foreign Application Priority Data

Mar. 14, 2003    (JP)    ............................. 2003-069942

(51) Int. Cl.
*H04N 1/04* (2006.01)
(52) U.S. Cl. ................. 358/474; 358/1.16; 358/426.05; 348/333.02; 348/231.7; 711/103; 711/758; 396/205
(58) Field of Classification Search ................. 358/474, 358/302, 461, 1.17, 1.16, 426.05; 396/205; 348/333.02, 335, 91; 386/126, 117; 711/103; 714/758, 52
See application file for complete search history.

(56) References Cited

U.S. PATENT DOCUMENTS 7,324,140 B2 * 1/2008 Kikuchi ................... 348/231.7
7,327,624 B2 * 2/2008 Yamagami et al. ........... 365/218
2001/0009453 A1 * 7/2001 Tsuchihashi et al. ......... 355/40
2002/0083282 A1 * 6/2002 Yoshino et al. ............. 711/163

FOREIGN PATENT DOCUMENTS

| JP | 07-123413 | 5/1995 |
| JP | 09-018540 | 1/1997 |
| JP | 11-187342 | 7/1999 |
| JP | WO 00/14740 | 3/2000 |
| JP | 2001-166972 | 6/2001 |

* cited by examiner

*Primary Examiner*—Edward L Coles
*Assistant Examiner*—Negussie Worku
(74) *Attorney, Agent, or Firm*—Gerald T. Bodner (57) ABSTRACT

An image processing apparatus includes a CPU. In a camera mode, a TIFF file in which main image data is stored in such a manner as to satisfy a predetermined condition is recorded by the CPU in a recording medium. When such the TIFF file is selected in a reproducing mode, the TIFF file itself is transferred from the recording medium to an SDRAM, and the main image data included in this TIFF file is subjected to a reproducing process by an ASIC. Herein, the predetermined condition includes a condition that a deviance amount between a head location of the TIFF file and a head location of the main image data is an integral multiple of "4", that is, the number of bytes storable in one address of the SDRAM.

14 Claims, 10 Drawing Sheets

[Bayer pattern grid showing G B G B G ... R G R G R pattern, labeled 14]

FIG. 3

(A) CAMERA MODE (B) REPRODUCING MODE

IMAGE PROCESSING APPARATUS

BACKGROUND OF THE INVENTION

1. Field of the Invention

The present invention relates to an image processing apparatus. More specifically, the present invention relates to an image process apparatus applied to a digital camera, and reproducing image data included in an image file recorded in a recording medium via an internal memory.

2. Description of the Prior Art

Image data stored in a TIFF file is non-compressed RGB data. When reproducing such the image data, a JPEG expansion process needs not to be performed, and the image data transferred from a recording medium to an internal memory is output to a monitor through a YUV conversion process and an encoding process into a composite video signal.

However, in a case that the recording medium adopts an FAT (File Allocation Table) system, and a reproducing system adopts a so-called word-access system, a following problem occurs. In the FAT system, a data reading-out is based on a cluster unit so that when the image data starts from a middle of the cluster, noise data not related to the image data is read out first. In this case, it is not guaranteed that a writing of the image data is started from the 0-th byte of an address (=word) forming the internal memory. However, unless the writing of the image data is started from the 0-th byte of the address, it is not possible to satisfy the word-access system.

As a consequence, in a digital camera of the prior art, a memory controller capable of accessing the internal memory in a byte unit is provided, and an arrangement of the image data on the internal memory is changed in such a manner as to be adapted to the word-access system.

However, in the prior art, there is a problem that it takes more time in the reproducing process by a change of the arrangement of the image data.

SUMMARY OF THE INVENTION

Therefore, it is a primary object of the present invention to provide an image processing apparatus capable of reducing a time period for reproducing.

An image processing apparatus according to the present invention comprises: a recorder for recording into a recording medium an image file in which image data is stored; a transferor for transferring at least the image data from the recording medium to an internal memory; and a reproducer for reproducing the image data transferred to the internal memory by the transferor, wherein each address forming the internal memory has a capacity of an L byte (L: integer of two or more), the recording medium is divided into a plurality of unit areas each of which has a capacity of an M byte (M: integral multiple of the L), and the recorder stores the image data into the image file in such a manner that the image data transferred to the internal memory by the transferor is started from a head byte of an address.

Into a recording medium, an image file in which image data is stored is recorded by a recorder. A transferor transfers at least the image data from the recording medium to an internal memory, and a reproducer reproduces the image data transferred to the internal memory. Herein, each address forming the internal memory has a capacity of an L byte (L: integer of two or more), the recording medium is divided into a plurality of unit areas each of which has a capacity of an M byte (M: integral multiple of the L). The recorder stores the image data into the image file in such a manner that the image data transferred to the internal memory is started from a head byte of the address.

As a result of the image data transferred to the internal memory being started from the head address, a change of an arrangement as in the prior art is not needed. Thereby, attempting to reduce a time period required for reproducing.

Preferably, specific size data having a size of an integral multiple of the L byte is created by a creator. At this time, the recorder stores into the image file the specific size data and the image data from a file head in this order, and the transferor transfers to the internal memory the specific size data and said image data. The specific size data has a size of an integral multiple of the L byte so that the image data transferred to the internal memory is started from a head byte of a certain address formed in the internal memory.

Preferably, specific size data having a size of an integral multiple of the M byte is created by a creator. At this time, the recorder stores into the image file the specific size data and the image data from a file head in this order, and the transferor transfers to the internal memory only the image data, out of the specific size data and the image data. The specific size data has a size of an integral multiple of the M byte so that the image data recorded in the recording medium is started from a head byte of a certain unit area.

Therefore, as a result of the only image data being transferred to the internal memory, the image data is started from the head byte of a certain address formed in the internal memory.

Preferably, the reproducer processes the image data by the L byte unit. In addition, each of the plurality of unit areas is preferably an area that allows to be accessed only from a head. Furthermore, preferably, the image file has a size of an N byte larger than an M byte.

According to the present invention, an image processing apparatus that reproduces via an internal memory image data included in an image file recorded in a recording medium comprises: a detector for detecting a size of specific data existing between a head location of the image file and a head location of the image data; and a first transferor for transferring to the internal memory the specific data and the image data in this order when the size of the specific data satisfies a first condition, wherein each address forming the internal memory has a capacity of an L byte (L: integer of two or more), the recording medium is divided into a plurality of unit areas each of which has a capacity an M byte (M: integral multiple of the L), and the first condition is a condition that the size of the specific data is an integral multiple of the L byte.

Image data included in an image file recorded in a recording medium is reproduced via an internal memory. A detector detects a size of specific data existing between a head location of the image file and a head location of the image data. When the size of the specific data satisfies a first condition, the specific data and the image data are transferred by a first transferor to the internal memory in this order. Herein, each address forming the internal memory has a capacity of an L byte (L: integer of two or more), the recording medium is divided into a plurality of unit areas each of which has a capacity an M byte (M: integral multiple of the L). The first condition is a condition that the size of the specific data is an integral multiple of the L byte.

As a result of the specific data and the image data being transferred to the internal memory in this order when the size of the specific data is an integral multiple of the L byte, the image data is to be started from a head byte of a certain address formed in the internal memory. Thereby, a change of an arrangement of the image data as in the prior art is rendered unnecessary, thus, it is attempted to reduce a time period required for reproducing.

Preferably, only the image data, out of the specific data and the image data, is transferred to the internal memory via a second transferor when the size of the specific data satisfies a second condition, besides the first condition. Herein, the second condition is a condition that the size of the specific data is an integral multiple of an M byte. As a result of only the image data being transferred to the internal memory when the size of the specific data is the M byte, the image data is to be started from a head byte of a certain address formed in the internal memory.

Preferably, an accessor accesses an address on the internal memory in which a head portion of the image data is stored based on a detecting result of the detector. This enables to read out only the image data. Thus, an appropriate data processing is realized.

Preferably, a recorder records into the recording medium an image file in which the specific data that satisfies one of the first condition and the second condition, and the image data are stored.

According to the present invention, an image processing apparatus that reproduces via an internal memory image data included in an image file recorded in a recording medium comprises: a detector for detecting a size of specific data existing between a head position of the image file and a head position of the image data, and a transferor for transferring to the internal memory only the image data, out of the specific data and the image data, when the size of the specific data satisfies a predetermined condition, wherein each address forming the internal memory has a capacity of an L byte (L: integer of two or more), the recording medium is divided into a plurality of unit areas each of which has a capacity of an M byte (M: integral multiple of the L), and the predetermined condition is a condition that the size of the specific data is an integral multiple of the M byte.

The image data included in an image file recorded in a recording medium is reproduced via an internal memory. The detector detects a size of specific data existing between a head position of the image file and a head position of the image data. When the size of the specific data satisfies a predetermined condition, only said image data, out of the specific data and the image data, is transferred to the internal memory by a transferor. Herein, each address forming the internal memory has a capacity of an L byte (L: integer of two or more), the recording medium is divided into a plurality of unit areas each of which has a capacity of an M byte (M: integral multiple of L). The predetermined condition is a condition that the size of the specific data is an integral multiple of the M byte.

When the size of the specific data is the M byte, only the image data is transferred to the internal memory, and thereby, the image data is to be started from a head byte of a certain address formed in the internal memory. This eliminates the need to change an arrangement of the image data as in the prior art, thus attempting to reduce a time period required for reproducing.

The above described objects and other objects, features, aspects and advantages of the present invention will become more apparent from the following detailed description of the present invention when taken in conjunction with the accompanying drawings.

DETAILED DESCRIPTION OF THE PREFERRED EMBODIMENTS

Figure 1:
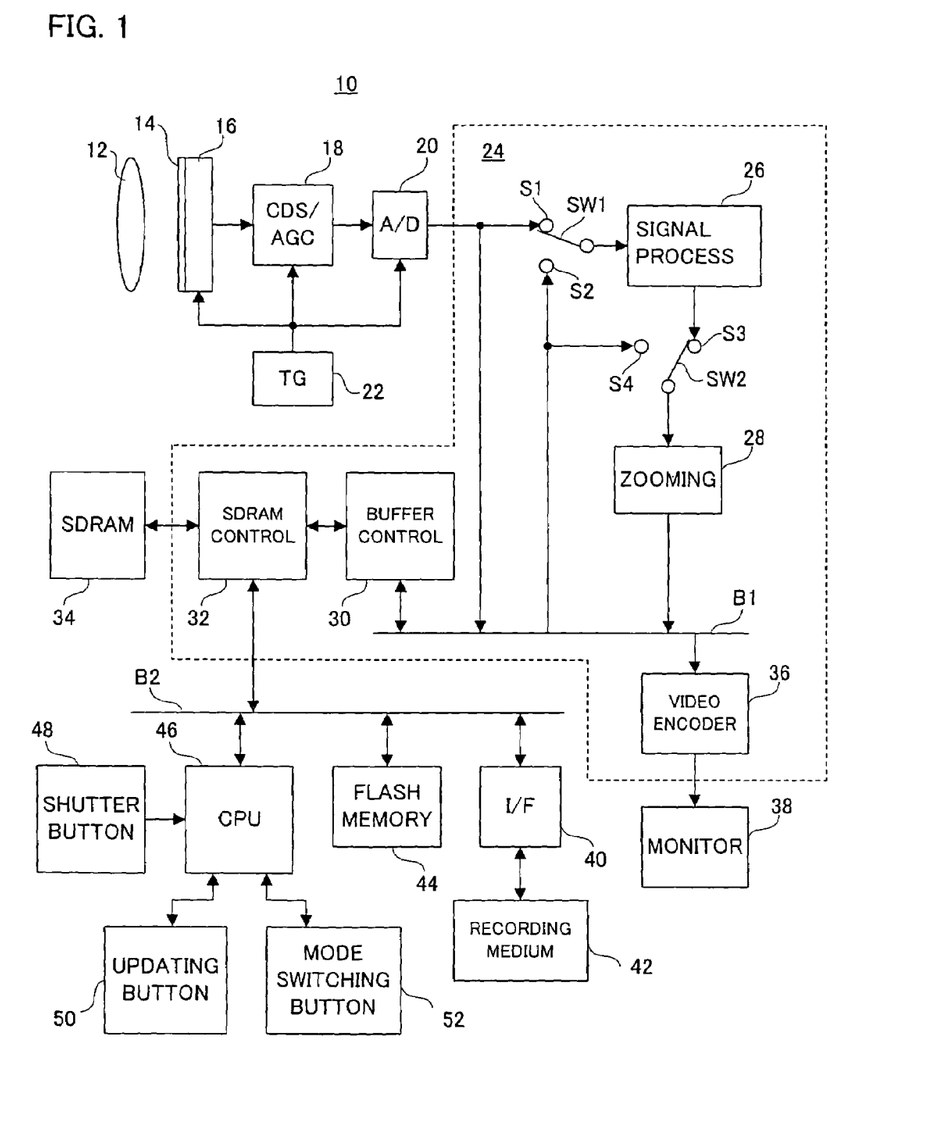
FIG. 1 is a block diagram showing one embodiment of the present invention.

Referring to FIG. 1, a digital camera (image processing apparatus) 10 in this embodiment includes a CCD imager 16 that adopts an interline transferring system. A light-receiving surface of the CCD imager 16 is covered by a color filter 14, and an optical image of an object scene is irradiated onto the light-receiving surface of the CCD imager 16 via an aperture unit 12 and the color filter 14.

Figure 2:
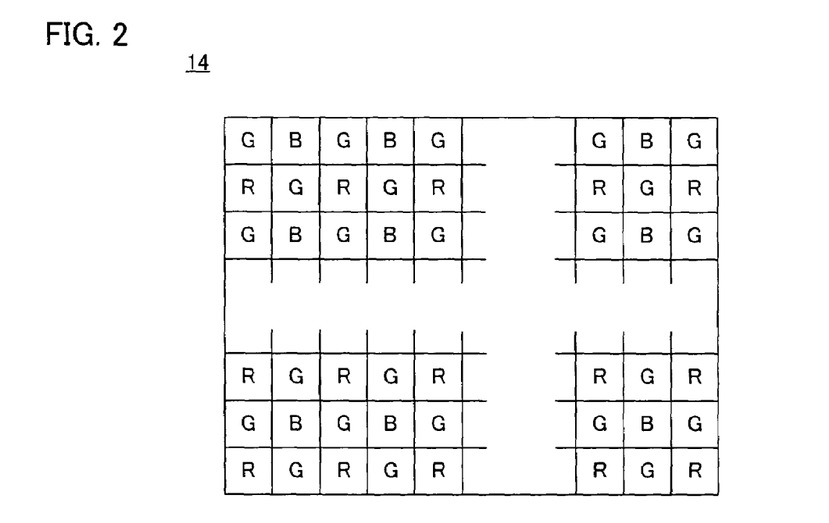
FIG. 2 is an illustrative view showing one example of a color filter adapted in the FIG. 1 embodiment.

Referring to FIG. 2, the color filter 14 is a color filter of a Bayer pattern, and each color element corresponds at the rate of one color to one pixel to a light receiving element, that is, a pixel, formed on the light-receiving surface of the CCD imager 16. Therefore, an electric charge created by a photo-electronic conversion in each light receiving element, that is, a pixel signal, has color information of R, G or B.

When a camera mode is selected by a mode switching button 52 for displaying a real-time moving image (through image) of the object scene in an LCD monitor 38, a CPU 46 sets a thinning-out reading-out mode to a TG 22, and instructs an ASIC 24 on a through-image displaying process. The TG 22 subjects the CCD imager 16 to a pre-exposure at every time that a vertical synchronizing signal is occurred, and reads out the electric charge created by this pre-exposure from the CCD imager 16 in a thinning-out manner. In the ASCI 24, a switch SW1 is connected to a terminal Si, and a switch SW2 is connected to a terminal S3. In addition, an RAW/YUV mode is set to a signal processing circuit 26, and a reduction zooming magnification appropriate for displaying the through image is set to a zooming circuit 28

A raw image signal circularly output from the CCD imager 16 is subjected to a noise removal and a level adjustment by a CDS/AGC circuit 18, and converted into raw image data, that is, digital data, by an AID converter 20. The converted raw image data is applied to the signal processing circuit 26 via the switch SW1, and subjected to a series of processes, that is, a white balance adjustment, a color separation, and a YUV conversion. YUV data thus generated is applied to a zooming circuit 28 via the SW2, and subjected to a reduction zooming process. When display-use YUV data is obtained by the reduction zooming, the display-use YUV data is applied to a buffer control circuit 30 via a bus B1.

Figure 4:
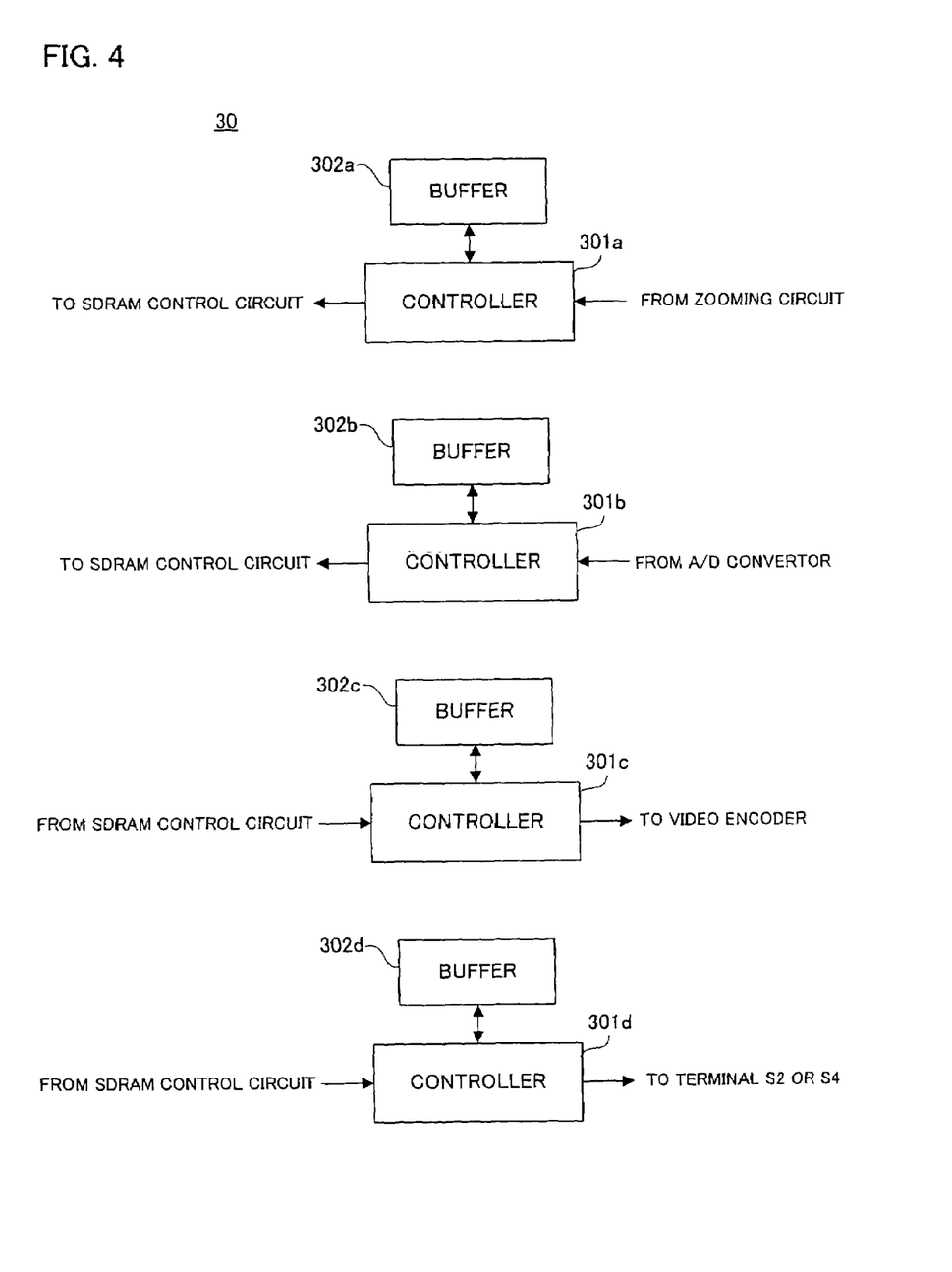
FIG. 4 is a block diagram showing one example of structure of a buffer control circuit adapted in the FIG. 1 embodiment.

Referring to FIG. 4, the buffer control circuit 30 has controllers 301a-301d with buffers 302a-302d being respectively assigned thereto, in which the data is temporarily stored. A data writing into an SDRAM 34 is performed by the controllers 301a-301b, and a data reading from the SDRAM 34 is performed by the controllers 301c-301d.

Figure 3:
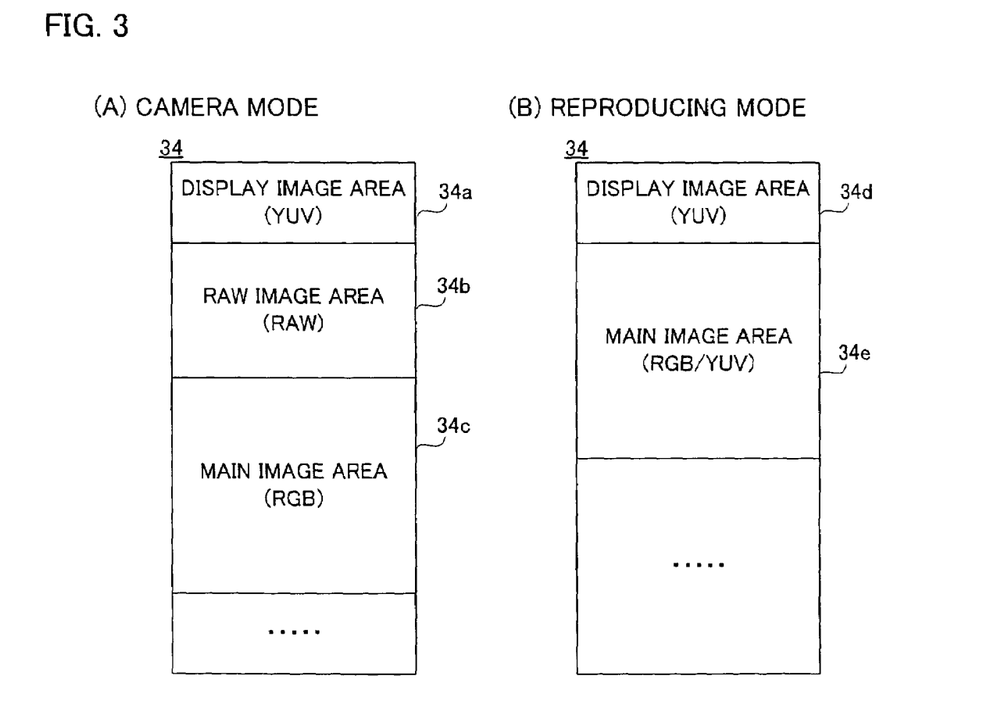
FIG. 3(A) is an illustrative view showing one example of a mapping state of an SDRAM when a camera mode is selected.
FIG. 3(B) is an illustrative view showing one example of a mapping state of the SDRAM when a reproducing mode is selected.

The display-use YUV data output from the zooming circuit 28 shown in FIG. 1 is applied to an SDRAM control circuit 32 via the controller 301a and the buffer 302a. In a camera mode, the SDRAM 34 is mapped according to FIG. 3(A), and the SDRAM control circuit 32 writes the applied display-use YUV data into a display image area 34a.

The display-use YUV data stored in the display image area 34a is read out by the SDRAM control circuit 32, and output to a video encoder 36 via the controller 301c and the buffer 302c. In the video encoder 36, the display-use YUV data is converted into a composite video signal, and the converted composite video signal is applied to an LCD monitor 38. As a result, the through image of the object scene is displayed on a monitor screen.

When a shutter button 48 is operated, the CPU 46 sets a whole pixel reading-out mode to the TG22, and instructs the SAIC 24 on a freeze image displaying process. In response to a subsequent vertical synchronizing signal, the TG 22 subjects the CCD imager 16 to a main exposure, and reads out all the electric charges generated by the main exposure from the CCD imager 16 in an interlace scanning manner. In the ASIC 24, a connection of the switch SW1 is switched to a terminal S2, and the reduction zooming magnification appropriate for displaying a freeze image is set to the zooming circuit 28.

One frame of the raw image signal output from the CCD imager 16 permeates the CDS/AGC circuit 18, and converted into raw image data in the A/D converter 20. The converted raw image data is directly input into the buffer control circuit 30, and applied to the SDRAM control circuit 32 via the controller 301b and the buffer 302b. The raw image data is written into a raw image area 34b shown in FIG. 3(A) by the SDRAM control circuit 32. At this time, the raw image data in an odd-number field is stored in a former half portion of the raw image area 34b, and the raw image data in an even-number field is stored in a latter half portion of the raw image area 34b.

The raw image data stored in the raw image area 34b is read out by the SDRAM control circuit 32. The raw image data in the odd-number field and the raw image data in the even-number field are alternately read out by each line, and thereby, the interlace scanning data is converted into progressive scanning data. The converted raw image data is applied to the bus B1 via the controller 301d and the buffer 302d, and input into the signal processing circuit 26 via the switch SW1 shown in FIG. 1.

The signal processing circuit 26 subjects the applied raw image data to the white balance adjustment, the color adjustment, and the YUV conversion, and applies the YUV data thereby generated to the zooming circuit 28 through the switch SW2. The zooming circuit 28 subjects the applied YUV data to the reduction zooming process, and thereby, the display-use YUV data is generated.

The generated display-use YUV data is applied to the SDRAM control circuit 32 via the controller 301a and the buffer 302a shown in FIG. 4, and written into the display image area 34a of the SDRAM 34 by the SDRAM control circuit 32. The display-use YUV data stored in the display image area 34a is applied to the video encoder 36 by a similar process as when outputting the through image, and converted into the composite video signal. The converted composite video signal is applied to the LCD monitor 38, and as a result, the freeze image of the object scene is displayed on the monitor screen.

Upon completion of displaying the freeze image, the CPU 46 instructs the ASIC 24 on a main image generating process. A mode of the signal processing circuit 26 is changed from an RAW/YUV mode to a RAW/RGB mode, and the zooming magnification of the zooming circuit 28 is changed to "1.0". In addition, the SDRAM control circuit 32 reads out the raw image data stored in the raw image area 34b once again.

The read raw image data is input into the signal processing circuit 26 as above described. It is noted that the mode of the signal processing circuit 26 has been changed so that the raw image data is subjected to the white balance adjustment and the color separation, and thereby, RGB data is output from the signal processing circuit 26. The output RGB data is applied to the zooming circuit 28 via the switch SW2. It is noted that the zooming magnification of the zooming circuit 28 is "1.0" so that the RGB data is as it is output from the zooming circuit 28.

The RGB data output from the zooming circuit, that is, the main image data, is applied to the SDRAM control circuit 32 through the controller 301a and the buffer 302a shown in FIG. 4, and thereby, written into a main image area 34c shown in FIG. 3(A).

When the main image data is secured in the main image area 34c, the CPU 46 creates header data by itself, and reads out the main image data from the main image area 34c through the SDRAM control circuit 34. Subsequently, the CPU 46 applies the created header data and the read main image data to a recording medium 42 through a bus B2 and an I/F 40. As a result, an image file including the header data and the main image data, that is, a TIFF file, is recorded into the recording-medium 42.

When a reproducing mode is selected by the mode switching button 52, the CPU 46 reads out at least the main image data from the TIFF file recorded in the recording medium 42, and applies the read main image data to the SDRAM control circuit 34. In the reproducing mode, the SDRAM 34 is mapped according to FIG. 3(B), and the main image data is written into a main image area 34e by the SDRAM control circuit 34.

Upon completion of writing, the CPU 46 instructs the ASIC 24 on a reproducing process. Thereby, the switch SW1 is connected to a terminal S2, and the switch SW2 is connected to a terminal S4. In addition, the signal processing circuit 26 is set to the RGB/YUV mode, and the zooming magnification of the zooming circuit 28 is set to "1.0".

The main image data stored in the main image area 34e is read out by the SDRAM controller 32, applied to the bus B1 via the controller 301d and the buffer 302d shown in FIG. 4, and subsequently, input into the signal processing circuit 26 via the switch SW1. The signal processing circuit 26 subjects the applied main image data to the YUV conversion. Thereby, a format of the main image data is changed to an RGB format to a YUV format. The main image data output from the signal processing circuit 26 is applied to the bus B1 via the switch SW2 and the zooming circuit 28, and subsequently, applied to the SDRAM control circuit 32 via the controller 301a and the buffer 302a shown in FIG. 4. The main image data of the YUV format is written into the main image area 34e shown in FIG. 3(B).

It is noted that the YUV conversion executed by the signal processing circuit 26 is a so-called 4:2:2 conversion, and a size of the main image data of the YUV format is rendered smaller than a size of the main image data of the RGB format. Thus, the main image data yet to be converted is not overwritten by the main image data already converted.

Upon completion of writing the main image data of the RGB format, the CPU 46 instructs the ASIC 24 on a displaying process. Thereby, the switch SW2 is connected to a terminal S4, and the reduction zooming magnification appropriate for displaying a reproduced image is set to the zooming circuit 28.

The SDRAM control circuit 32 reads out the main image data of the YUV format from the main image area 34e shown in FIG. 3(B). The read main image data is applied to the bus B1 via the controller 301d and the buffer 302d shown in FIG. 4, and input into the zooming circuit 28 via the switch SW2, later. The zooming circuit 28 subjects the input main image data to the reduction zooming process so as to generate the display-use YUV data.

The generated display-use YUV data is applied to the SDRAM control circuit 32 via the controller 301a and the buffer 302a shown in FIG. 4, and written into the display image area 34d shown in FIG. 3(B). The display-use YUV data stored in the display image area 34d is subjected to a similar process as the above-described through-image displaying process or the freeze image displaying process, and as a result, the reproduced image is displayed on the LCD monitor 38.

It is noted that if an updating button 50 is operated, the above-described process is executed toward another TIFF file. Thereby, the reproduced image is updated.

Figure 5:
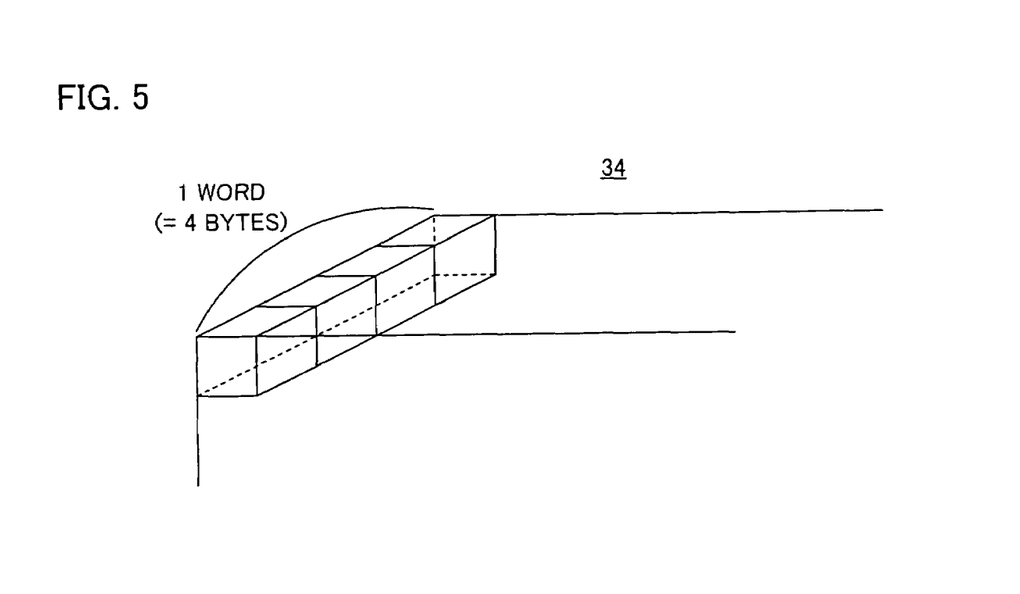
FIG. 5 is an illustrative view showing one portion of structure of the SDRAM adapted in the FIG. 1 embodiment.
Figure 6:
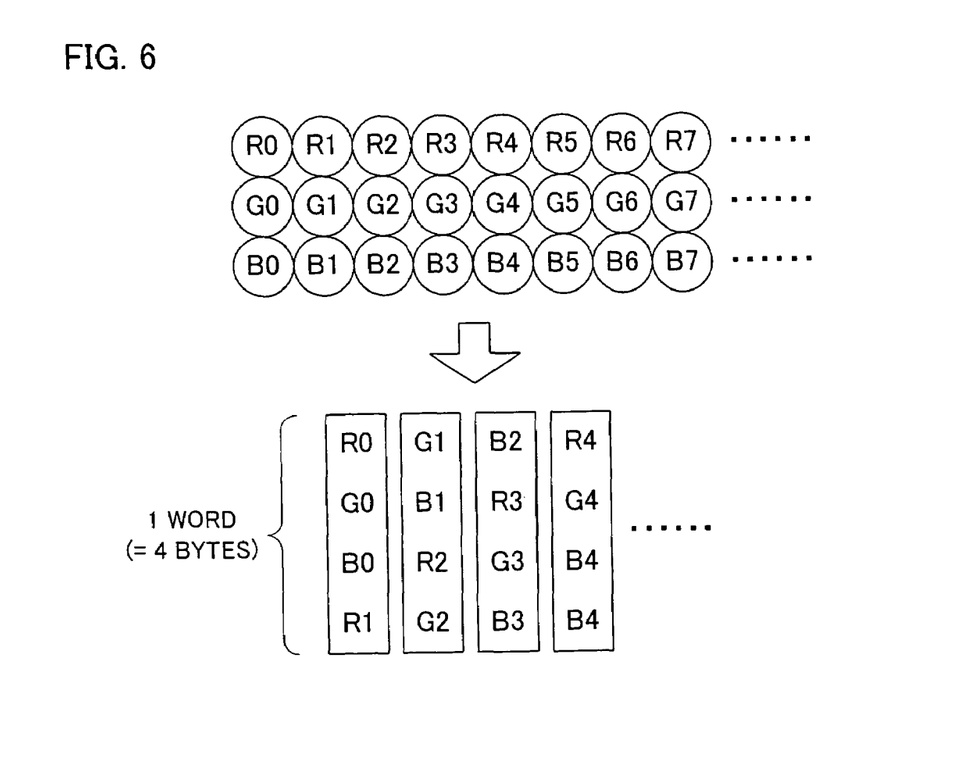
FIG. 6 is an illustrative view showing one portion of an operation of the FIG. 1 embodiment.

Referring to FIG. 5, each address (=word) forming the SDRAM 34 is 4 bytes. In addition, the ASIC 24 performs a data process in a word-access system. Thus, the data to be processed needs to be arranged from a head byte of the address, that is, the 0-th byte. Consequently, regarding the main image data of the RGB format, a data arrangement as shown in FIG. 6 is required. That is, R data, G data, or B data, corresponding to one pixel is 1 byte (=8 bits), and the data needs to be arranged in the order of R0, G0, B0, R1, G1, B1, . . . , after the 0-th byte of the head address.

Figure 7:
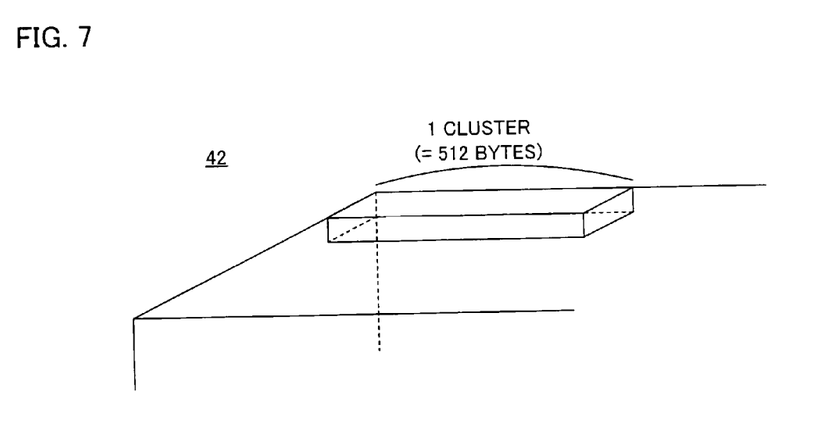
FIG. 7 is an illustrative view showing one portion of structure of a recording medium adapted in the FIG. 1 embodiment.

On the other hand, referring to FIG. 7, the recording medium 42 adopts an FAT system as a file managing system, and a data area is divided into a plurality of clusters. A size of one cluster is 512 bytes, and continuous 512 bytes of data are stored in each cluster. However, in the FAT system, in spite of a continuity of the data within one cluster being secured, a data access needs to be performed from a head of the cluster.

Therefore, when accessing the cluster in which desired main image data exists after the 130-th byte, for example, the desired main image data is read out with 130 bytes of unnecessary data, that is, noise data, being added to the head thereof.

Figure 8:
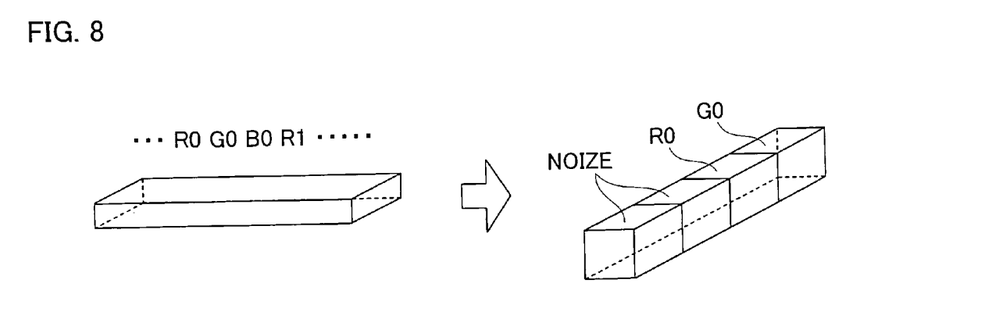
FIG. 8 is an illustrative view showing one portion of an operation when RGB data is transferred from the recording medium to the SDRAM.

Herein, if "130", that is, the number of bytes of the noise data, is divided by "4", that is, the number of bytes of one address forming the SDRAM 34, the remainder is "2". As a result, the desired main image data is arranged after the third byte of a certain address as shown in FIG. 8, and does not conform to the word-access system.

Consequently, in this embodiment, the header data having the number of bytes of an integral multiple of "4" or an integral multiple of "512" is created in the camera mode, and the created header data and the main image data are stored into the TIFF file. Then, when the TIFF file including the header data having the number of bytes of an integral multiple of "4" is selected in the reproducing mode, the header data and the main image data are transferred to the SDRAM 34. In addition, when the TIFF file including the header data having the number of bytes of an integral multiple of "512" is selected in the reproducing mode, only the main image data is transferred to the SDRAM 34. As a result, the main image data stored in the SDRAM 34 is always written after the 0-th byte of a certain address, and conforms to the word-access system.

Figure 9:
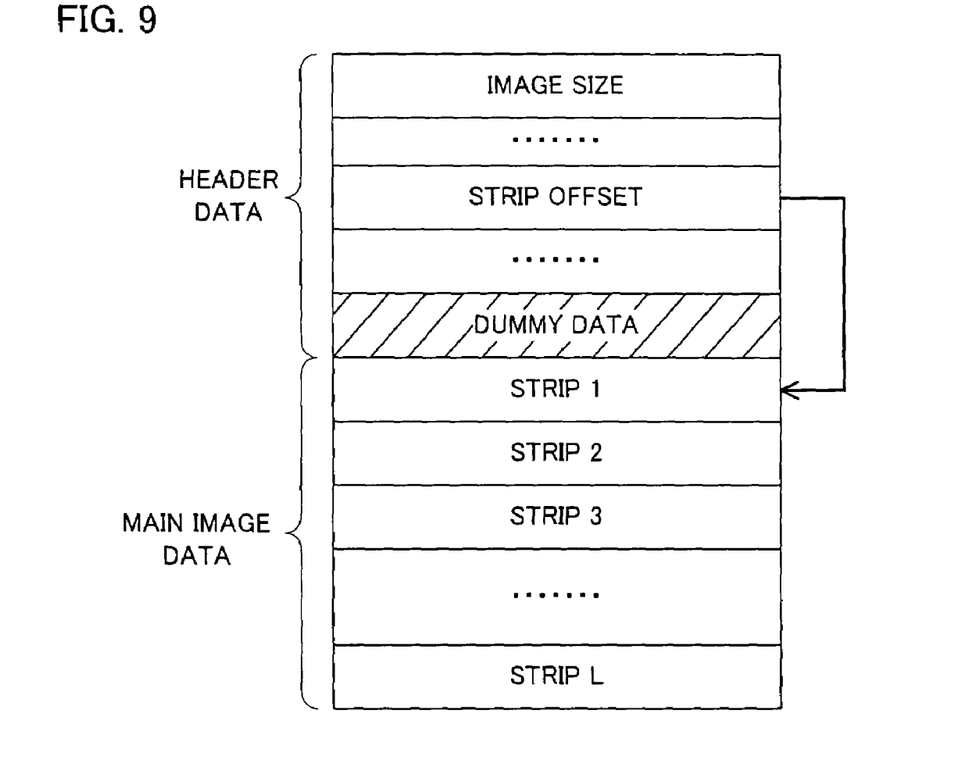
FIG. 9 is an illustrative view showing one portion of structure of a TIFF file created by the FIG. 1 embodiment.

More specifically, the TIFF file has structure shown in FIG. 9. According to FIG. 9, the header data is stored in a head portion of the TIFF file, and subsequent to the header data, the main image data is stored. The main image data is divided into a plurality of strips 1-L, and the header data has size information of the main image data and strip offset information. As the size information, the number of horizontal pixels and the number of vertical pixels of the main image data are written, and as the strip offset information, a deviation amount between the head address of the TIFF file and the head address of the strip 1 is written. Dummy data is added to an end portion of the header data, and thereby, the size of the header data is adjusted to an integral multiple of 4 bytes or an integral multiple of 512 bytes.

It is noted that the recording medium 42 is detachable, and there is a case that the TIFF file recorded by another digital camera and the size of the header data does not satisfy the above described condition, too, exists in the recording medium. When such the TIFF file is selected in the reproducing mode, similar to the prior art, only the main image data is transferred to the SDRAM 34, and a re-arranging process is executed for the arrangement appropriate for the word-access system.

Figure 10:
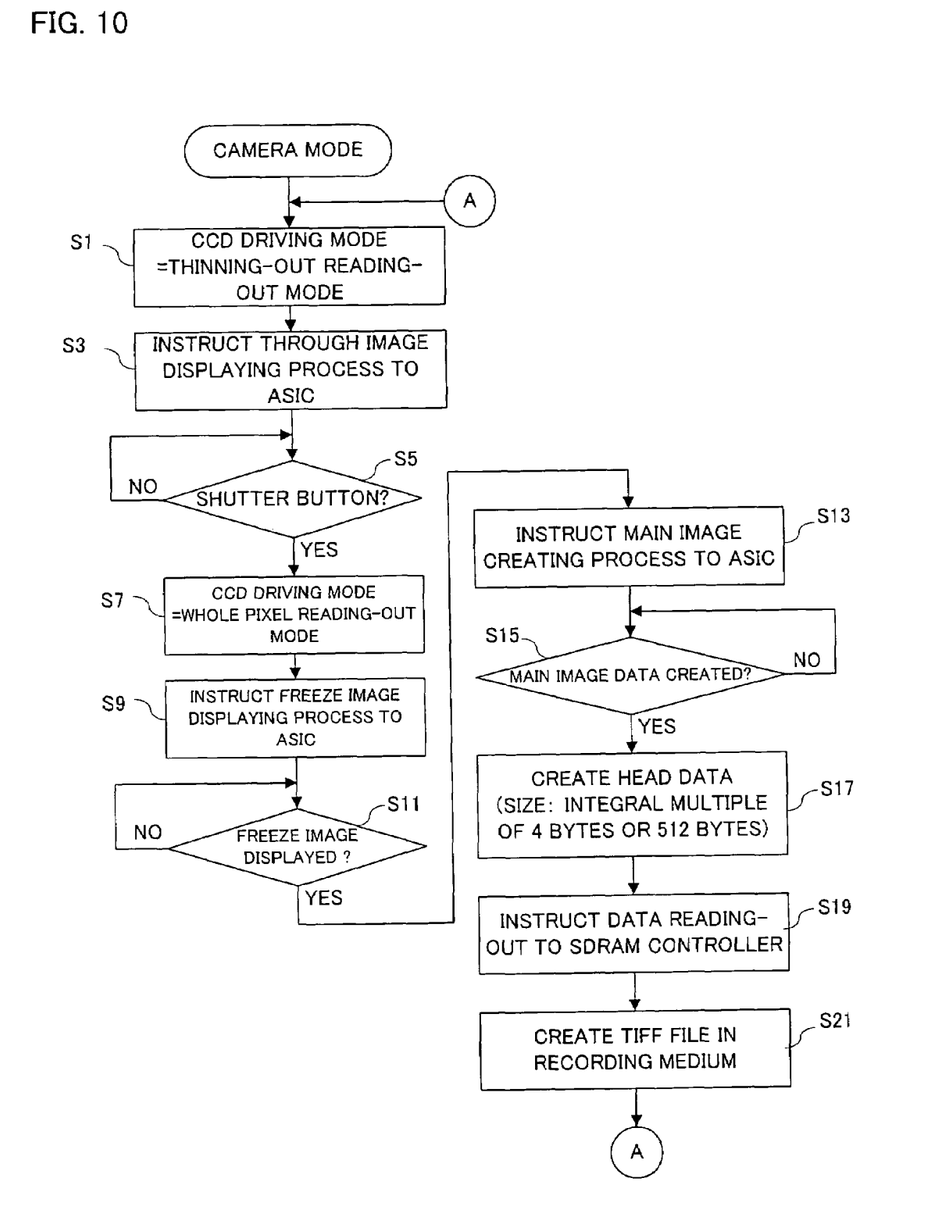
FIG. 10 is a flowchart showing one portion of an operation of the FIG. 1 embodiment.
Figure 11:
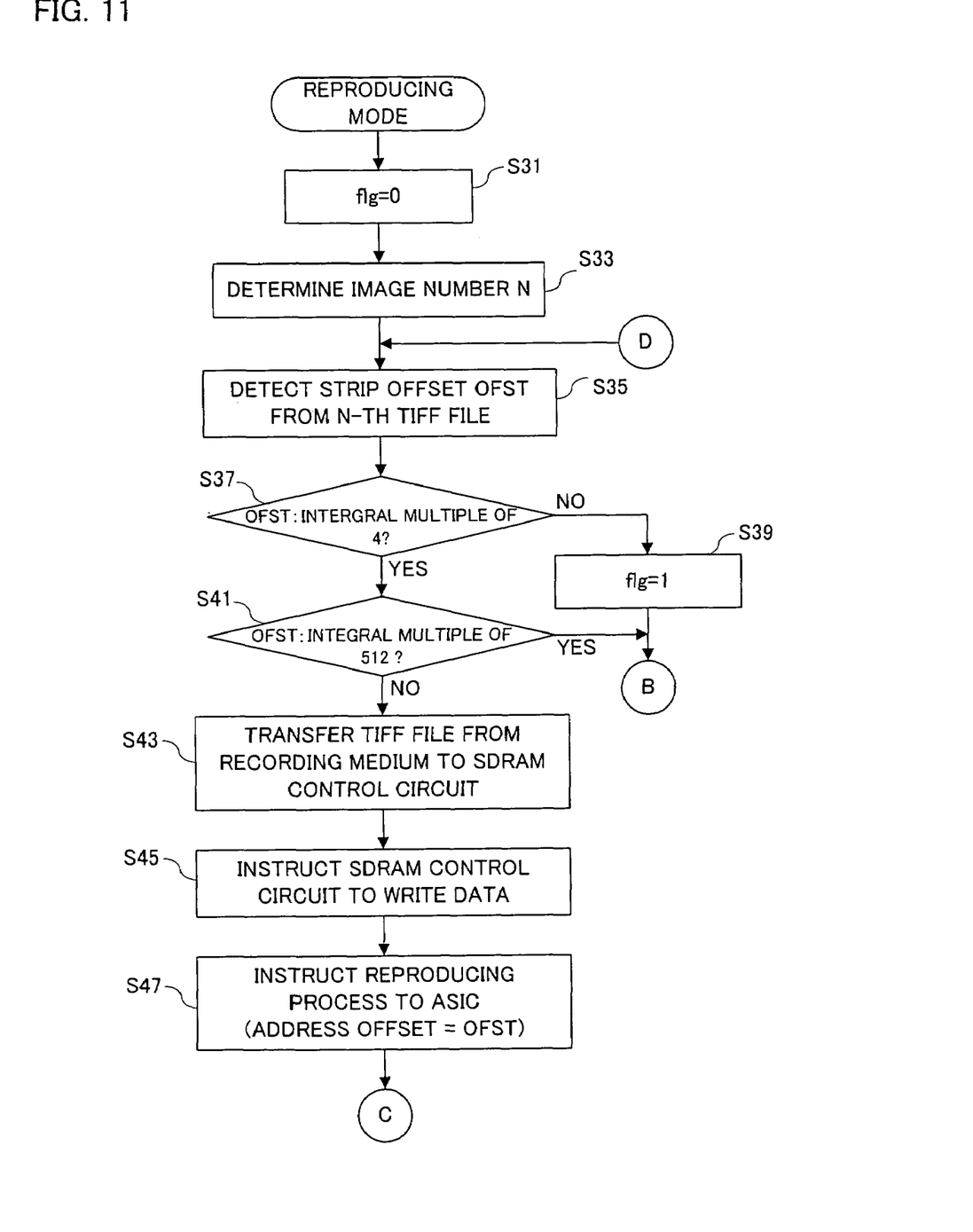
FIG. 11 is a flowchart showing another portion of the operation of the FIG. 1 embodiment.
Figure 12:
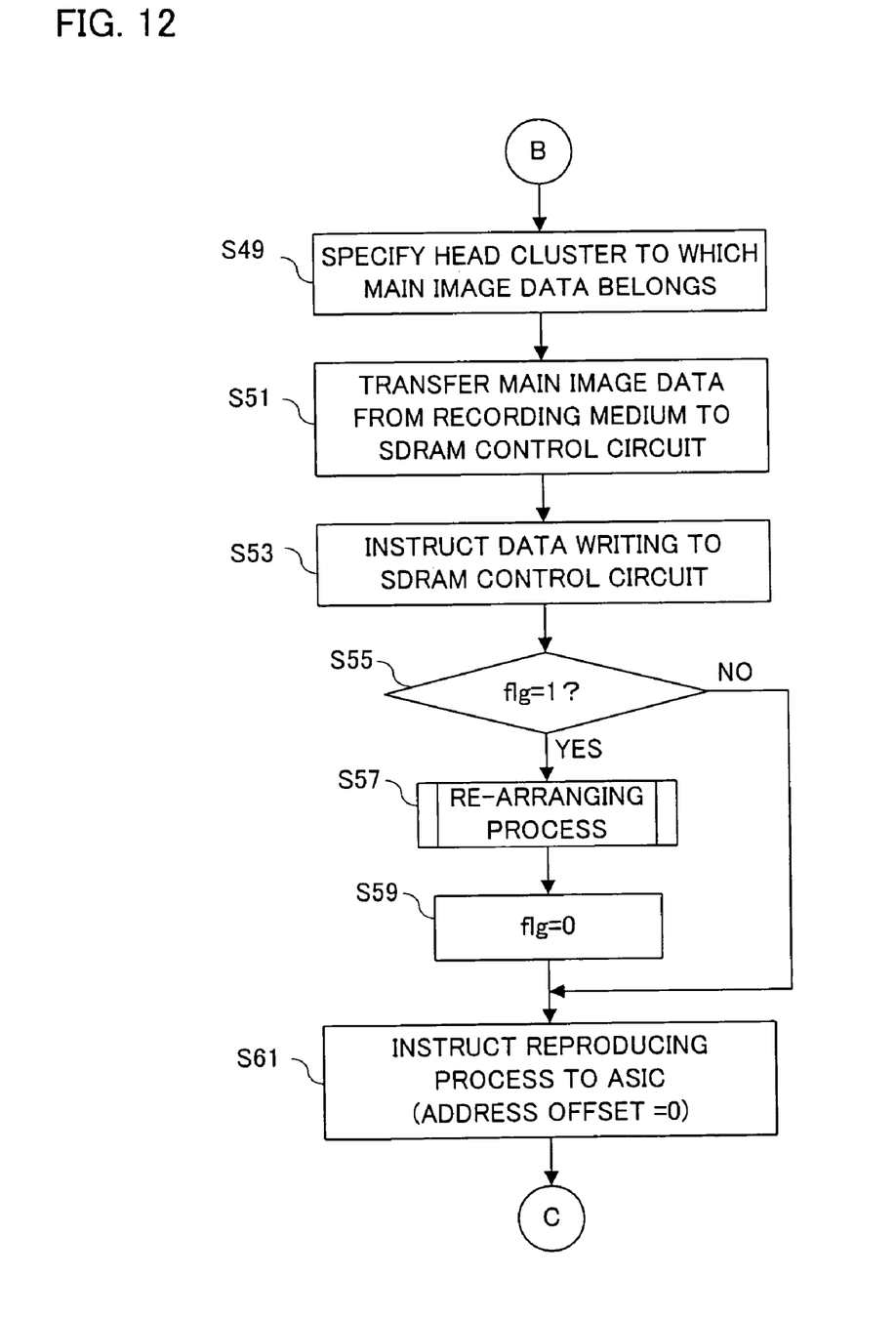
FIG. 12 is a flowchart showing the other portion of the operation of the FIG. 1 embodiment.
Figure 13:
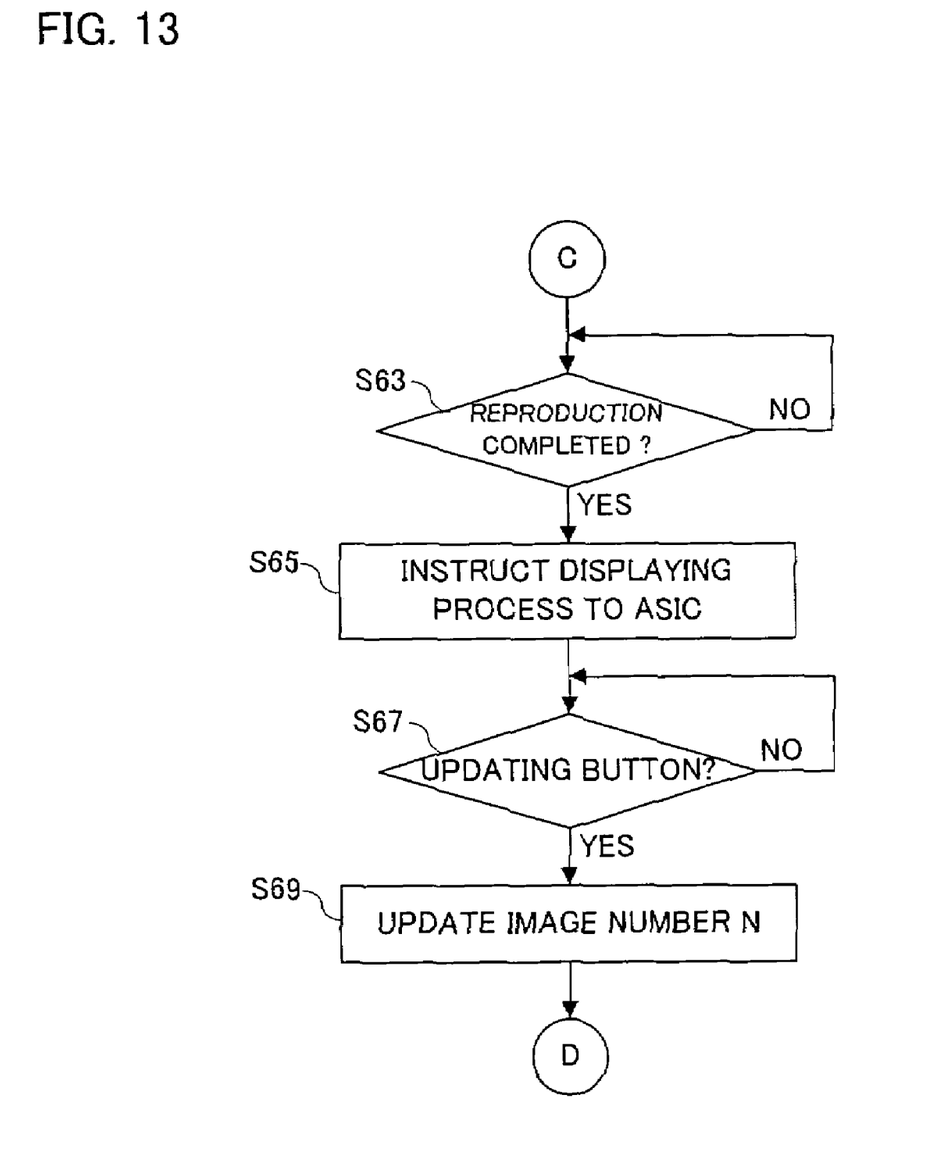
FIG. 13 is a flowchart showing a further portion of the operation of the FIG. 1 embodiment.

When the camera mode is selected, the CPU 46 executes a process according to a flowchart shown in FIG. 10, and when the reproducing mode is selected, the CPU 46 executes a process according to a flowchart shown in FIG. 11. It is noted that a control program corresponding to these flowcharts is stored in a flash memory 44.

Referring to FIG. 10, in the camera mode, first, the thinning-out reading-out mode is set to the TG 22 in a step S1, and a through-image display process is instructed to the ASIC 24 in a step S3. As a result, the through image of the object scene is displayed on the LCD monitor 38. When the shutter button 48 is operated, YES is determined in a step S5. In a step S7, the whole pixel reading-out mode is set to the TG 22, and in a step S9, the freeze image displaying process is instructed to the ASIC 24. As a result, a display of the LCD monitor 38 is updated from the through image to the freeze image. When the display of the freeze image is obtained, YES is determined in a step S11, and a main image creating process is instructed to the ASIC 24 in a step S13. As a result, the main image data of the RGB format is secured in the main image area 34c shown in FIG. 3(A).

Upon completion of creating the main image data, YES is determined in a step S15, and the header data is created in a step S17. The dummy data is added to an end of the created header data, and thereby, the data size is adjusted to an integral multiple of 4 bytes or an integral multiple of 512 bytes. In a step S19, the SDRAM control circuit 32 is instructed to read out the main image data stored in the main image area 34c. When the main image data is read out, the process advances to a step S21 so as to record into the recording medium 42 the TIFF file including the header data created by itself and the read main image data. Upon completion of the process of the step S21, the process returns to the step S1.

Referring to FIG. 11, in the reproducing mode, first, a variable fig is set to "0" in a step S31, and the image number N is determined in a step S33. In a succeeding step S35, the TIFF file corresponding to the image number N is specified from the recording medium 42a, and a head strip offset value OFST written in the specified TIFF file is detected. In a step S37, it is determined whether or not the offset value OFST is an integral multiple of "4", and in a step S41, it is determined whether or not the offset value OFST is an integral multiple of "512".

Unless the offset value OFST is "4", the process sets the variable fig to "1" in a step S39, and then, advances to a step S49. If the offset value OFST is an integral multiple of "4", and an integral multiple of "512", the process directly advances to the step S49. Even if the offset value OFST is an integral multiple of "4", and not an integral multiple of "512", the process advances to a step S43.

In the step S43, the TIFF file corresponding to the image number N, that is, the header data and the main image data, are transferred from the recording medium 42 to the SDRAM control circuit 32. In a step S45, the SDRAM control circuit 32 is instructed to write the data. The header data and the main image data are written into the main image area 34e shown in FIG. 3(B) by the SDRAM control circuit 32. In a succeeding step S47, the reproducing process is instructed to the ASIC 24. In this instruction, the strip offset value OFST detected in the step S33 is included as an address offset value.

Based on the address offset value included in the instruction, the SDRAM control circuit 32 specifies a reading-out starting address of the main image data. The TIFF file is written from the head address of the main image area 34e so that the address having an accumulated value of the head address value of the main image area 34e and the address offset value is specified as the reading-out starting address. As a result, the main image data is appropriately subjected to the reproducing process, and the main image data converted into the YUV format is written into the main image area 34e.

On the other hand, in the step S49, the cluster in which the head portion of the desired main image data is recorded is specified. In a succeeding step S51, the main image data recorded in the clusters starting from the specified cluster is transferred to the SDRAM control circuit 32, and in a step S53, the SDRAM control circuit 32 is instructed to write the transferred main image data. The main image data is written into the main image area 34e shown in FIG. 3.

Upon completion of the writing, a value of the variable flg is determined in a step S55, and if flg is equal to (=) 1, the re-arranging process of the main image data is performed in a step S57. The re-arranging process allows the main image data to be started from the 0-th byte of the head address of the main image area 34e. Upon completion of the re-arranging process, the process sets the variable flg to "0" in a step S59, and advances to a step S61. On the other hand, if it is determined that flg is equal to (=) "0" in a step S55, the process directly advances to the step S61, considering that the re-arranging process is not needed.

In the step S51, the reproducing process is instructed to the ASIC 24. The address offset value included in this instruction is "0", and the head address of the main image area 34e is specified as the reading-out starting address. As a result, the main image data is appropriately subjected to the reproducing process, and the main image data converted into the YUV format is written into the main image area 34e.

In a step S63, it is determined whether or not the reproducing process based on the instruction of the step S47 or S61 is completed. If YES, a displaying process is instructed to the ASIC 24 in a step S65. As a result, the reproduced image based on the main image data stored in the main image area 34e is displayed on the LCD monitor 38. In a step S67, it is determined whether or not the updating button 50 is operated, and if YES, the process updates the image number N in a step S69, and then, returns to the step S35.

As understood from the above descriptions, in the camera mode, the TIFF file in which the main image data is stored in such a manner as to satisfy a first condition or a second condition is recorded in the recording medium 42 by the CPU 46. Herein, the first condition is a condition that the size of the header data, that is, the head strip offset value, is an integral multiple of "4", that is, the number of bytes storable in one address of the SDRAM 34, and the second condition is a condition that the strip offset value is an integral multiple of "512", that is, the number of bytes storable in one cluster of the recording medium 42.

In the reproducing mode, when the TIFF file that satisfies only the first condition, out of the first condition and the second condition, the header data and the main image data included in the selected TIFF file is transferred from the recording medium 42 to the SDRAM 34 in this order. When the TIFF file that satisfies both the first condition and the second condition, only the main image data included in the selected TIFF file is transferred from the recording medium 42 to the SDRAM 34. The transferred main image data is subjected to the reproducing process according to the word-access system, later.

As a result of the first condition and the second condition being provided, and the data transfer being performed in a manner according to the condition that the selected TIFF file satisfies, the main image data stored in the SDRAM 34 is always started from the head of a certain address. Therefore, the rearranging is not needed as in the prior art, and thus, reducing a time period required for reproducing the main image data.

In this embodiment, the descriptions are made by using the CCD imager of an interlace scanning type. However, the CCD imager of a progressive scanning type may be used in place thereof. Furthermore, in place of the CCD imager, a CMOS imager may be used.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An image processing apparatus, comprising:
   a recorder for recording into a recording medium an image file in which image data is stored;
   a transferor for transferring at least said image data from said recording medium to an internal memory; and
   a reproducer for reproducing said image data transferred to said internal memory by said transferor, wherein
   each address forming said internal memory has a capacity of an L byte (L: integer of two or more), said recording medium is divided into a plurality of unit areas each of which has a capacity of an M byte (M: integral multiple of the L), and said recorder stores said image data into said image file in such a manner that said image data transferred to said internal memory by said transferor is started from a head byte of an address.

2. An image processing apparatus according to claim 1, further comprising a creator for creating specific size data having a size of an integral multiple of said L byte, wherein said recorder stores into said image file said specific size data and said image data from a file head in this order, and said transferor transfers to said internal memory said specific size data and said image data.

3. An image processing apparatus according to claim 1, further comprising a creator for creating specific size data having a size of an integral multiple of said M byte, wherein said recorder stores into said image file said specific size data and said image data from a file head in this order, and said transferor transfers to said internal memory only said image data, out of said specific size data and said image data.

4. An image processing apparatus according to claim 1, wherein said reproducer processes said image data by said L byte unit.

5. An image processing apparatus according to claim 1, wherein each of said plurality of unit areas is an area that allows to be accessed only from a head.

6. An image processing apparatus according to claim 1, wherein said image file has a size of an N byte (N>M).

7. An image processing apparatus that reproduces via an internal memory image data included in an image file recorded in a recording medium, comprising:
  a detector for detecting a size of specific data existing between a head location of said image file and a head location of said image data; and
  a first transferor for transferring to said internal memory said specific data and said image data in this order when the size of said specific data satisfies a first condition, wherein each address forming said internal memory has a capacity of an L byte (L: integer of two or more), said recording medium is divided into a plurality of unit areas each of which has a capacity an M byte (M: integral multiple of the L), and said first condition is a condition that the size of said specific data is an integral multiple of said L byte.

8. An image processing apparatus according to claim 7, further comprising a second transferor for transferring to said internal memory only said image data, out of said specific data and said image data, when a size of said specific data satisfies a second condition, wherein said second condition is a condition that that size of said specific data is an integral multiple of said M byte.

9. An image processing apparatus according to claim 7, further comprising an accessor for accessing an address on said internal memory in which a head portion of said image data is stored based on a detecting result of said detector.

10. An image processing apparatus according to claim 7, further comprising a recorder for recording into said recording medium an image file in which the specific data that satisfies one of said first condition and said second condition and the image data are stored.

11. An image processing apparatus that reproduces via an internal memory image data included in an image file recorded in a recording medium, comprising:
  a detector for detecting a size of specific data existing between a head position of said image file and a head position of said image data, and
  a transferor for transferring to said internal memory only said image data, out of said specific data and said image data, when the size of said specific data satisfies a predetermined condition, wherein each address forming said internal memory has a capacity of an L byte (L: integer of two or more), said recording medium is divided into a plurality of unit areas each of which has a capacity of an M byte (M: integral multiple of the L), and said predetermined condition is a condition that the size of said specific data is an integral multiple of said M byte.

12. An image processing method, comprising the steps of:
  (a) recording into a recording medium an image file in which image data is stored;
  (b) transferring at least said image data from said recording medium to an internal memory; and
  (c) reproducing said image data transferred to said internal memory by said step (b), wherein
  each address forming said internal memory has a capacity of an L byte (L: integer of two or more), said recording medium is divided into a plurality of unit areas each of which has a capacity of an M byte (M: integral multiple of the L), and said step (a) is a step for storing said image data into said image file in such a manner that said image data transferred to said internal memory by said step (b) is started from a head byte of said address.

13. An image processing method for reproducing via an internal memory image data included in an image file recorded in a recording medium, comprising the steps of:
  (a) detecting a size of specific data existing between a head location of said image file and a head location of said image data; and
  (b) transferring to said internal memory said specific data and said image data in this order when the size of said specific data satisfies a first condition, wherein each address forming said internal memory has a capacity of an L byte (L: integer of two or more), said recording medium is divided into a plurality of unit areas each of which has a capacity of an M byte (M: integral multiple of the L), and said first condition is a condition that the size of said specific data is an integral multiple of said L byte.

14. An image processing method for reproducing image data included in an image file recorded in a recording medium via an internal memory, comprising the steps of:
  (a) detecting a size of specific data existing between a head location of said image file and a head location of said image data; and
  (b) transferring to said internal memory only said image data, out of said specific data and said image data, when the size of said specific data satisfies a predetermined condition, wherein each address forming said internal memory has a capacity of an L byte (L: integer of two or more), said recording medium is divided into a plurality of unit areas each of which has a capacity an M byte (M: integral multiple of the L), and said predetermined condition is a condition that the size of said specific data is an integral multiple of said M byte.

* * * * *